US009767975B1

(12) United States Patent
Noel

(10) Patent No.: US 9,767,975 B1
(45) Date of Patent: Sep. 19, 2017

(54) MULTIPLE SWITCH FLOAT SWITCH APPARATUS HAVING A MAGNETIC COUPLING

(71) Applicant: Raymond Noel, Thornbury (CA)

(72) Inventor: Raymond Noel, Thornbury (CA)

( * ) Notice: Subject to any disclaimer, the term of this patent is extended or adjusted under 35 U.S.C. 154(b) by 0 days.

(21) Appl. No.: 15/092,680

(22) Filed: Apr. 7, 2016

(51) Int. Cl.
*H01H 9/00* (2006.01)
*H01H 35/18* (2006.01)
*E03F 5/10* (2006.01)
*G05D 7/06* (2006.01)
*G05D 9/12* (2006.01)

(52) U.S. Cl.
CPC .............. *H01H 35/18* (2013.01); *E03F 5/106* (2013.01); *G05D 7/0676* (2013.01); *G05D 9/12* (2013.01)

(58) Field of Classification Search
CPC ........ F04B 49/052; G01F 23/60; G01F 23/34; G01F 23/38; G01F 23/46; G01F 23/54; G01F 23/62; G01F 23/72; G01F 23/74; H01H 35/18; H01H 36/02
USPC .......................................................... 335/205
See application file for complete search history.

(56) References Cited

U.S. PATENT DOCUMENTS

| | | | | |
|---|---|---|---|---|
| 1,170,377 A | * | 2/1916 | Weed | F04B 49/04 137/397 |
| 1,695,846 A | * | 12/1928 | Harding | H01H 35/18 109/39 |
| 1,838,135 A | * | 12/1931 | Derby | G01F 23/64 200/225 |
| 2,106,204 A | * | 1/1938 | Burnell | B03B 5/24 209/496 |
| 2,726,296 A | * | 12/1955 | Hanson | G01F 23/56 200/275 |
| 2,820,865 A | * | 1/1958 | McKinnies | G01F 23/56 200/84 C |

(Continued)

*Primary Examiner* — Shawki S Ismail
*Assistant Examiner* — Lisa Homza

(57) ABSTRACT

The invention pertains to a float switch apparatus for use in activating one or a series of pumps. The float switch apparatus has particular use in combination with sump pump vessels. The apparatus includes an electrical chamber which is sealed from the vessel atmosphere and contains at least one switch controlling the activation of at least one pump, configured to pump liquid from the vessel. Within the electrical chamber there is a magnetic activation device which slides vertically along one wall of the chamber. On the opposing side of the chamber there is a magnetic coupling head which couples to the activation device magnetically through the coupling wall. The coupling head is mounted on top of a float rod having a float mechanism at the bottom thereof. The entire float switch apparatus is mounted in the vessel such that when the water reaches a predetermined level the float moves the float rod vertically and thus the coupling head is moved vertically. Since the coupling head is coupled to the magnetic activation device in the sealed electrical chamber, the activation device is also moved vertically and activates at least one switch for controlling the activation of a pump. The liquid in the vessel in then pumped out and the float rod moves down vertically in response. At a predetermined point the magnetic activation device no longer activates the switch controlling the pump and the pump is turned off. This device allows the electrical components of the float switch apparatus to remain sealed from the vessel atmosphere.

10 Claims, 12 Drawing Sheets

(56) References Cited

U.S. PATENT DOCUMENTS

| | | | | |
|---|---|---|---|---|
| 3,167,694 A * | 1/1965 | Bekedam | G01F 23/56 | 200/84 C |
| 3,270,158 A * | 8/1966 | Puster | G01F 23/56 | 200/84 C |
| 3,932,853 A * | 1/1976 | Cannon | H01H 35/186 | 210/91 |
| 4,064,755 A * | 12/1977 | Bongort | G01F 23/74 | 200/84 C |
| 4,086,457 A * | 4/1978 | Niedermeyer | H01H 35/186 | 200/81.9 HG |
| 4,186,419 A * | 1/1980 | Sims | H01H 36/02 | 200/84 C |
| 4,187,503 A * | 2/1980 | Walton | G08B 21/18 | 116/110 |
| 4,255,747 A * | 3/1981 | Bunia | G01F 23/18 | 200/84 R |
| 4,456,432 A * | 6/1984 | Mannino | F04D 13/068 | 417/2 |
| 4,647,740 A * | 3/1987 | Hansen, III | H01H 36/02 | 200/84 C |
| 4,755,640 A * | 7/1988 | Cooley | H01H 35/186 | 200/61.83 |
| 4,865,073 A * | 9/1989 | Kocher | F25B 41/065 | 137/412 |
| 4,988,978 A * | 1/1991 | Soto | G01F 23/36 | 116/110 |
| 5,155,311 A * | 10/1992 | Utke | H01H 36/02 | 200/81.4 |
| 5,449,274 A * | 9/1995 | Kochan, Jr. | F04D 15/029 | 417/12 |
| 5,728,987 A * | 3/1998 | Utke | H01R 13/585 | 200/302.1 |
| 5,829,303 A * | 11/1998 | Fraser | G01F 23/72 | 200/84 C |
| 6,149,390 A * | 11/2000 | Fisher | F04D 13/086 | 417/40 |
| 6,322,325 B1 * | 11/2001 | Belehradek | F04D 15/0218 | 417/2 |
| 6,461,114 B1 * | 10/2002 | Lin | F04D 15/0218 | 200/61.2 |
| 6,474,952 B1 * | 11/2002 | Fisher | F04D 15/0218 | 200/84 R |
| 8,985,964 B2 | 3/2015 | Noel | | |
| 2006/0093492 A1 * | 5/2006 | Janesky | F04D 29/426 | 417/366 |

* cited by examiner

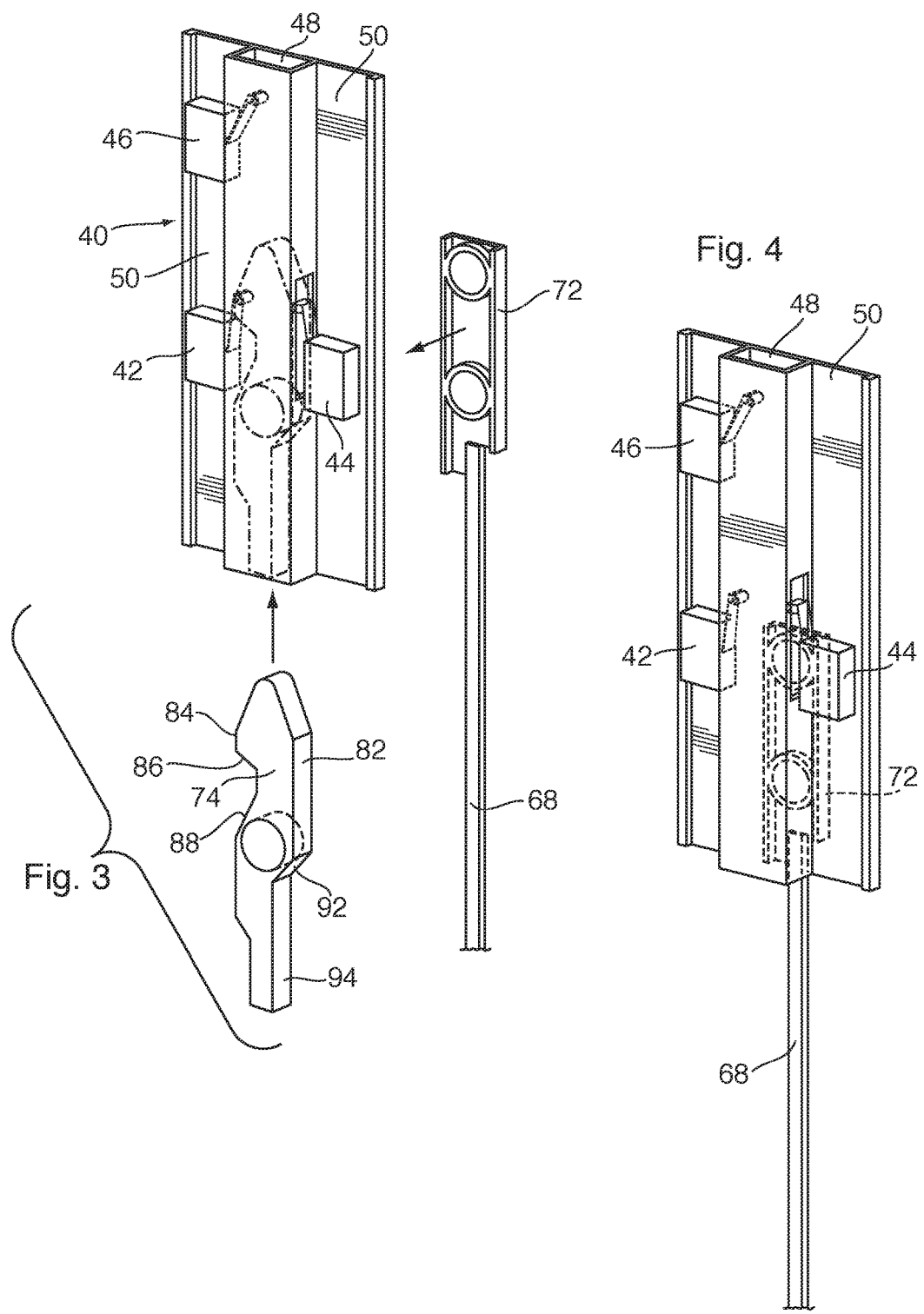

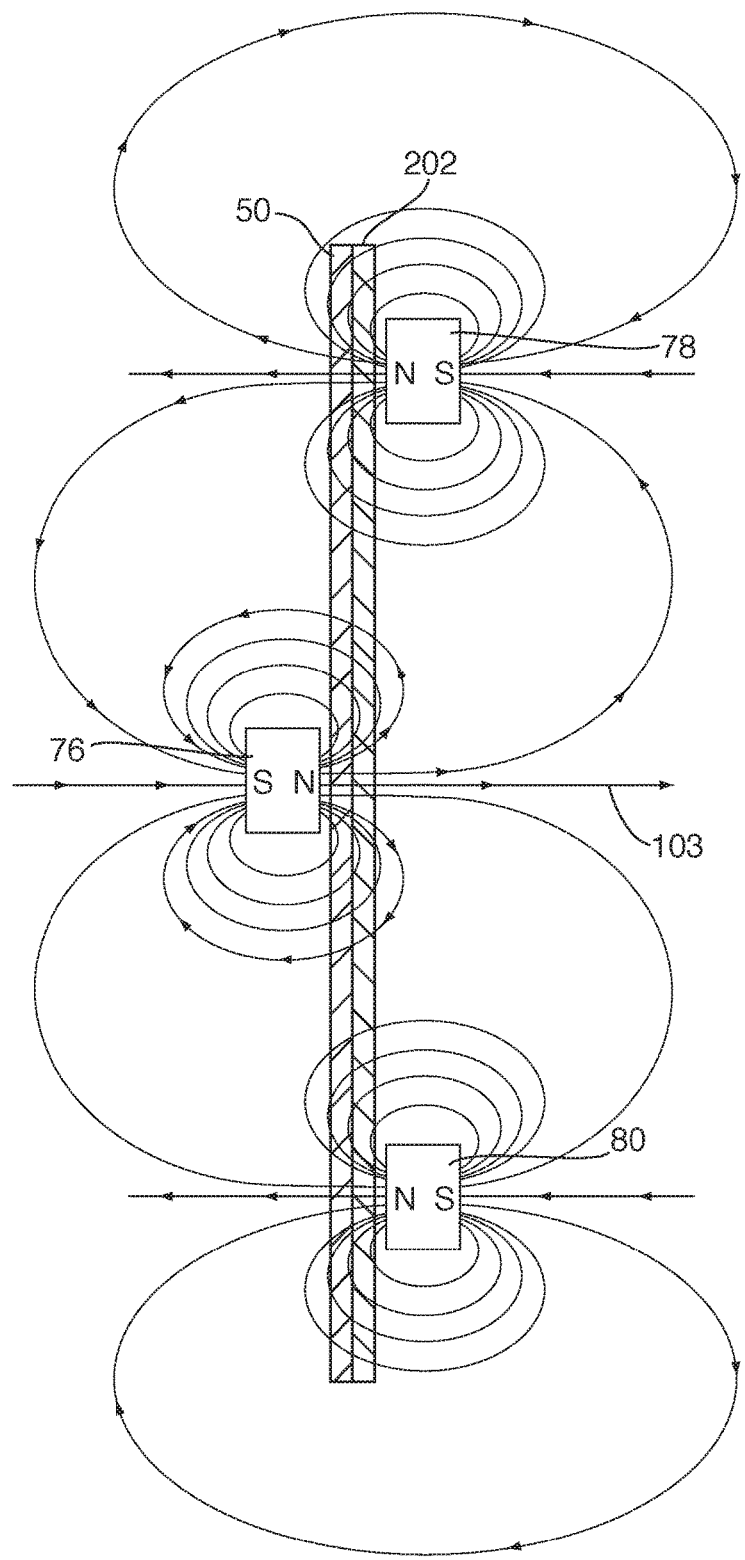

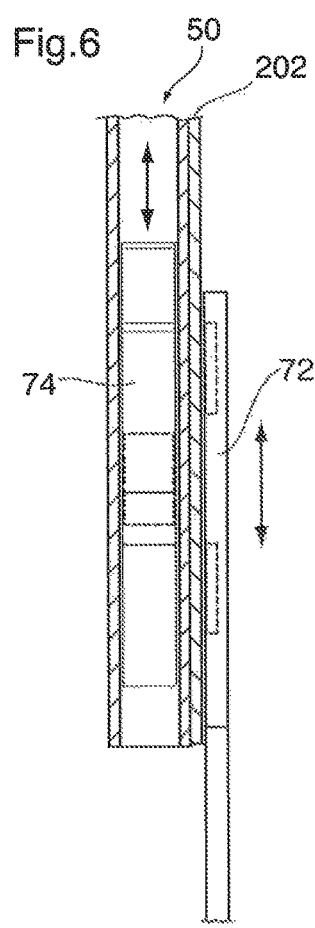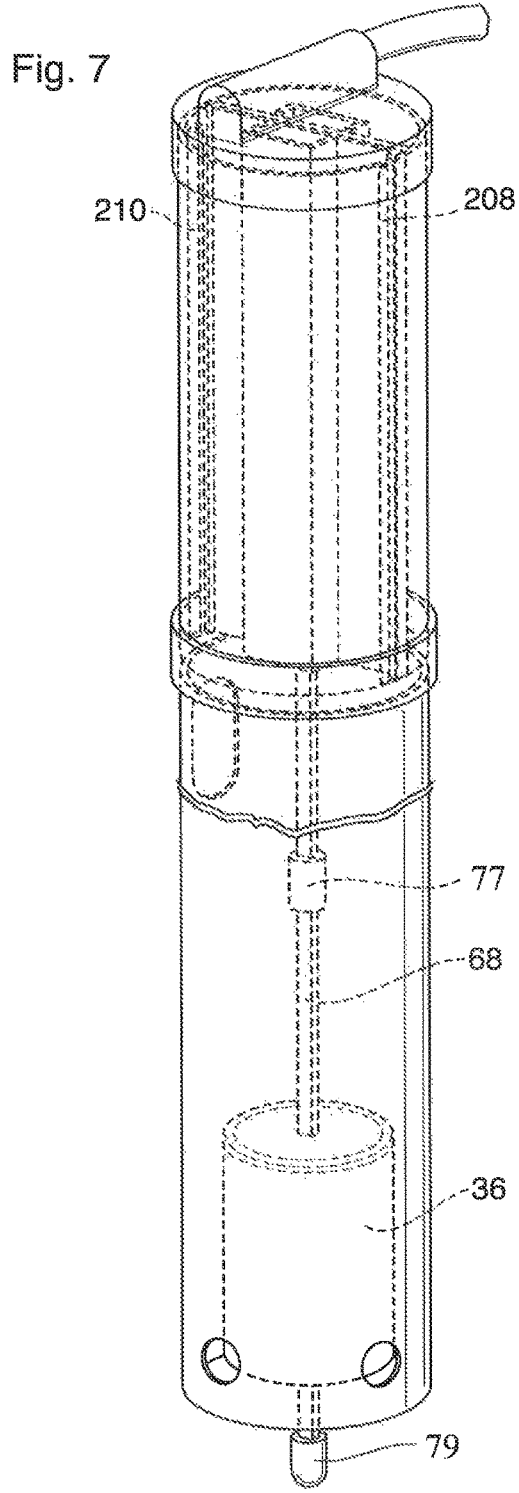

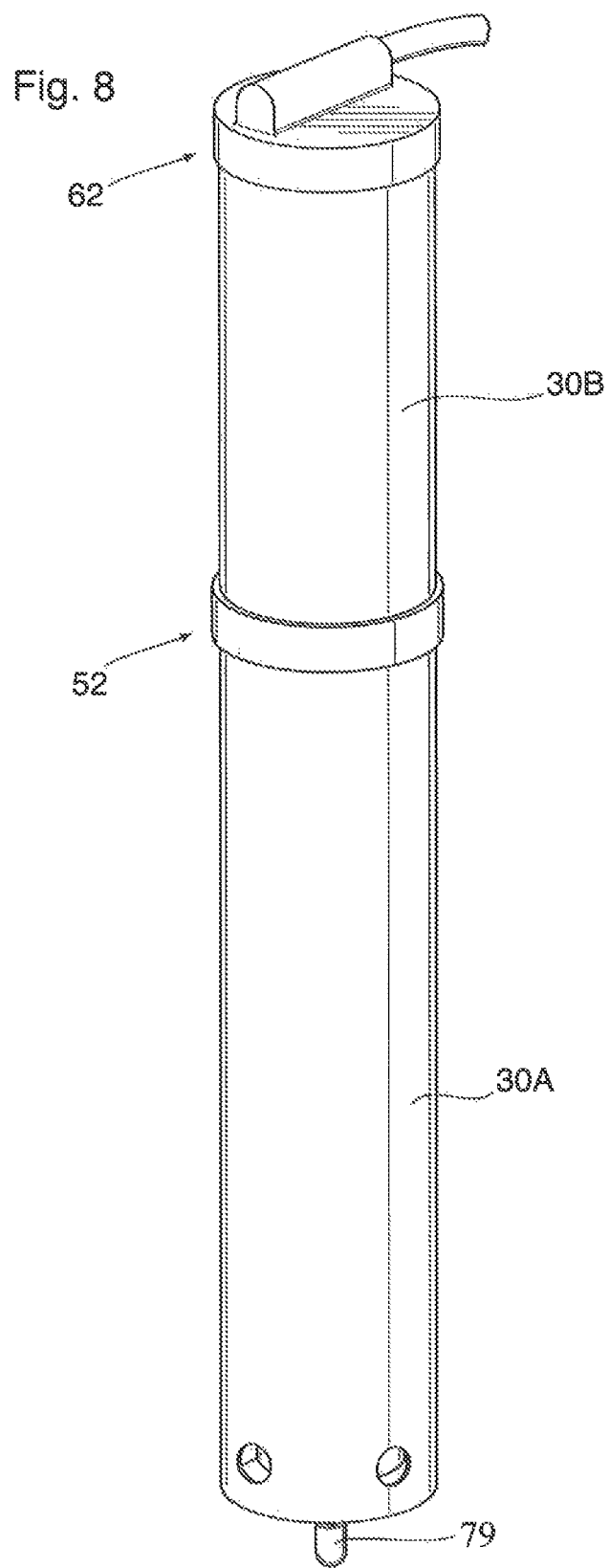

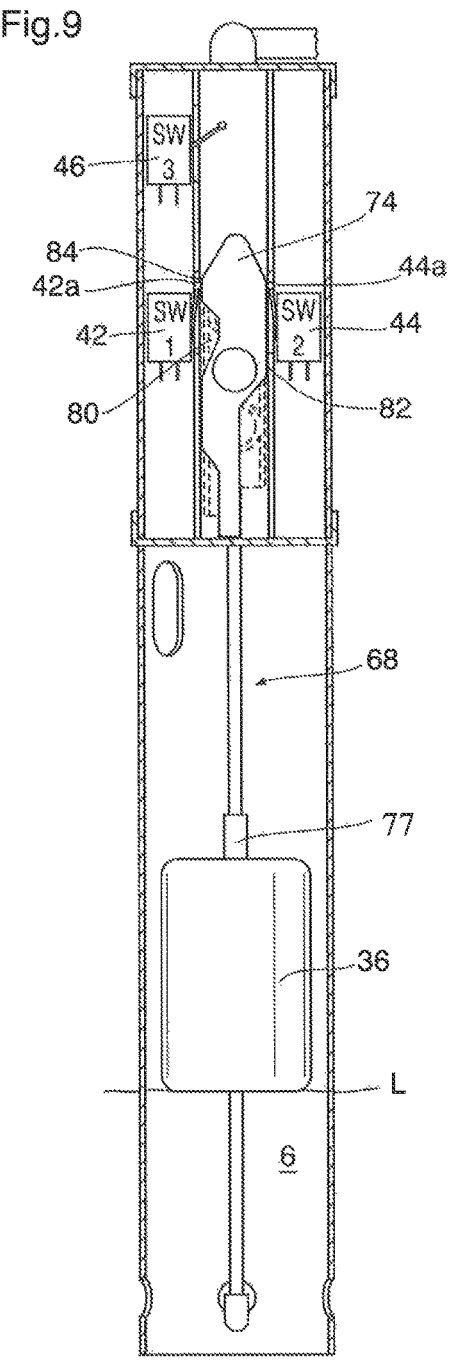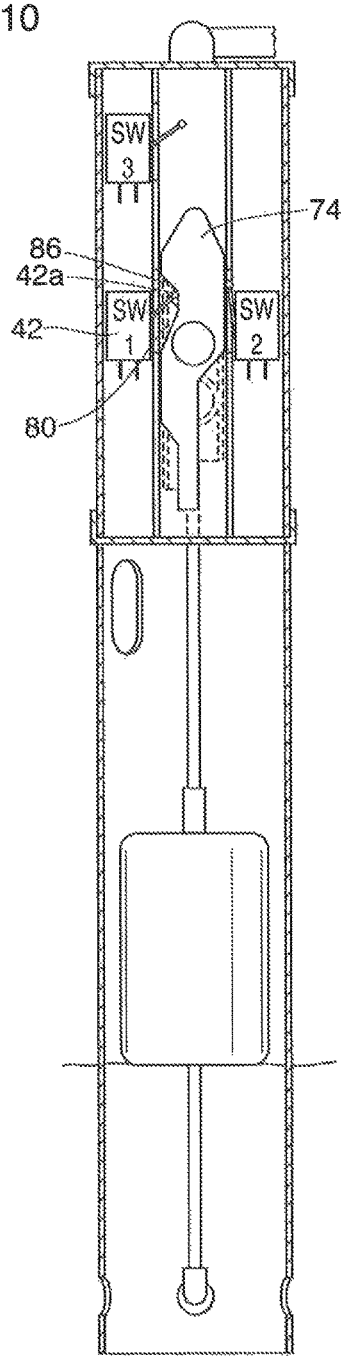

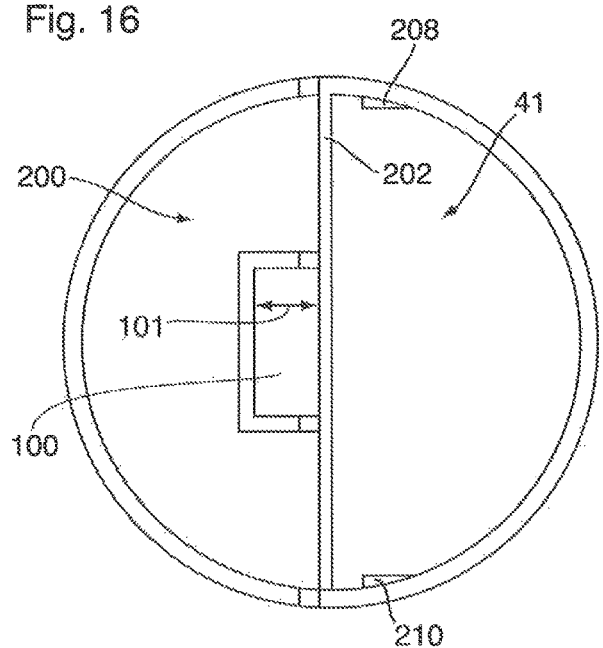
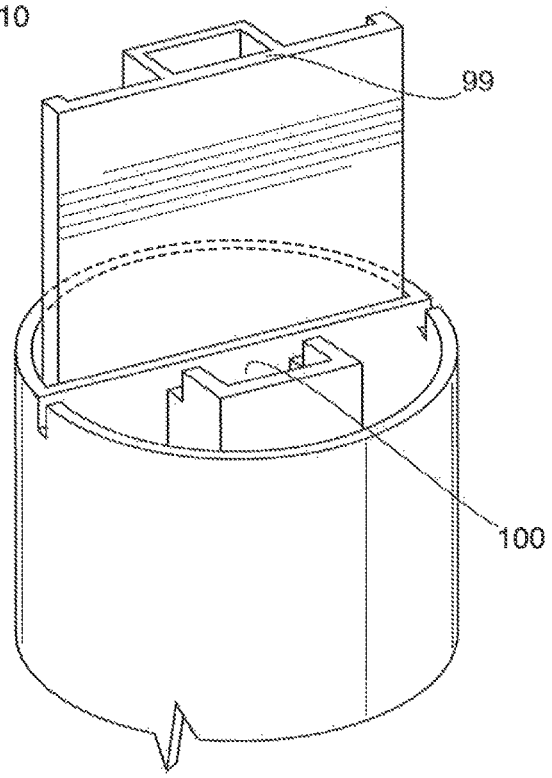

MULTIPLE SWITCH FLOAT SWITCH APPARATUS HAVING A MAGNETIC COUPLING

FIELD OF THE INVENTION

This invention relates to a magnetic coupling for use in a float switch apparatus. More specifically, it relates to a magnetic coupling for use in a float switch apparatus for controlling the energization of multiple electric circuits in response to the level of liquid in a vessel, such as a tank, vat or sump.

BACKGROUND OF THE INVENTION

There are numerous structures known for monitoring the level of liquid in a vessel, such as a tank, vat or sump, and either providing outputs indicating the level or taking various actions in response to the level.

Many different level sensing technologies have been used or proposed for such structures. For example, some such systems are based on sensors responsive to changes of pressure indicative of changes of liquid level. Others rely on the use of electrical probes whose electrical properties change with changes in the liquid level. However, many popular systems rely upon sensing the vertical displacement of a float floating on top of the liquid in the vessel.

Float mechanisms have been used in a variety of ways. In a conventional arrangement, a single float rises to a predetermined level, at which point an electrical switch or contact of some type is closed, thus energizing an associated electrical circuit such as an alarm or a pump motor.

Many systems utilize multiple pump and motor pairs to ensure that should one pump fail, another pump will turn on and ensure that the liquid is removed from the vessel.

One such arrangement uses a single float mechanism and a plurality of switches to turn on and off a series of pumps or alarms based on the level of the water in the vessel. One such system is disclosed in U.S. Pat. No. 8,985,964. This patent discloses the use of multiple micro switches. Each micro switch has an activation arm which cooperates with a specifically designed cam mounted on a float rod. The cam shape ensures that the activation arms are either activated or deactivated at various water levels to either activate or deactivate a pump corresponding to each micro switch.

However, in the apparatus disclosed in U.S. Pat. No. 8,985,964, the float switch apparatus is not sealed within a sump pit. According to many building codes, sump pits must be completed sealed from the external atmosphere to prevent the leakage of radon gas and other gases throughout a household or building. Furthermore any electrical components of the float switch apparatus must be completely isolated from the sump or vessel atmosphere to meet a variety of electrical or safety specifications. These electrical chambers must be vapor proof and water proof. As such, the multiple switch float apparatus as discussed in U.S. Pat. No. 8,985,964 may be insufficient for many geographical areas with safety requirements pertaining to sealed sump pits and/or electrical components which are required to be isolated from the sump atmosphere.

Currently sump pumps address the problem of maintaining a sealed sump pit by using a combination of floats such as tethered, pressure sensitive, vertical, magnetic reed and the like to perform the multiple tasks of operating several pumps and alarms. The float configuration would require multiple single float switches which can be expensive, cumbersome or prone to failure due to the various components becoming entangled with each other in the limited space of the sump pit vessel.

SUMMARY OF THE INVENTION

The invention pertains to a float switch apparatus for use in a sump pump vessel having an electrical chamber sealed from the vessel atmosphere and having a coupling wall. The electrical chamber includes at least one switch controlling the activation of at least one pump configured to pump liquid out of the vessel and further includes a magnetic activation device, which is slidable vertically along the coupling wall. The magnetic activation device is configured to activate said at least one switch when liquid in the vessel reaches a predetermined level. The float switch apparatus further includes a float that is responsive to liquid level in the vessel. The float is mounted on a float rod having a magnetic coupling head configured to magnetically couple to the magnetic activation device through the coupling wall such that vertical displacement of the magnetic coupling head results in a corresponding vertical displacement of the magnetic activation device. The float is mounted such that as the float responds to the liquid level in the vessel, the float will move the float rod and magnetic coupling head vertically.

In a further embodiment of the invention, the magnetic activation device is a cam.

In yet a further embodiment of the invention, the electrical chamber includes at least a first switch, a second switch and a third switch. The first switch is configured to be activated by the vertical position of the cam when the liquid in the vessel reaches a first predetermined level activating a first pump. The second switch is configured to be activated by the vertical position of the cam when the liquid in the vessel reaches a second predetermined level, activating a second pump and the third switch configured to be activated by the vertical position of the cam when the liquid in the vessel reaches a third predetermined level, activating a third pump.

In yet a further embodiment of the invention, the first switch is deactivated and the first pump is deactivated when the liquid level in the vessel reaches the second predetermined position.

In yet a further embodiment of the invention, two magnets are arranged in a spaced configuration in the coupling head and one magnet is arranged in the cam such that all like poles of the magnets are directed toward the coupling wall.

In yet a further embodiment of the invention, the magnets are disk magnets.

In yet a further embodiment of the invention, the magnets are axially magnetized neodymium disc magnets.

In yet a further embodiment of the invention, the magnetic coupling head is contained within a guide channel to facilitate easy alignment with the cam.

In yet a further embodiment of the invention, the cam is contained within a cam guide channel and both the cam guide channel and the coupling head guide channel have a depth determined such that the cam and coupling heads respectively maintain close contact with the coupling wall.

In yet a further embodiment of the invention, the guide channel has a collar through which a pin can be place to maintain the coupling head in the guide channel after assembly.

BRIEF DESCRIPTION OF THE DRAWINGS

Preferred embodiments of the invention are shown in the drawings, wherein:

FIG. 3 depicts the assembly of the cam in the electrical assembly;

FIG. 4 shows the position of the coupling head relative to the electrical assembly;

FIG. 5 shows the orientations of the 3 magnets relative to the chamber wall and separating wall;

FIG. 6 shows a cross sectional view of the cam and coupling head;

FIG. 7 depicts float switch apparatus without the switches;

FIG. 8 is a perspective view of the exterior of the float switch apparatus;

FIG. 9 shows the float rod and cam of the float switch apparatus in a first position when the liquid in the vessel is at an acceptable level;

FIG. 10 shows the float rod and cam of the float switch apparatus in a second position when the liquid in the vessel has reached a first predetermined level and the first switch is activated;

FIG. 16 is a top view of the upper portion of the guide tube;

FIG. 17 is a partial perspective view of the top of the upper portion of the guide tube with the electrical panel being inserted.

DETAILED DESCRIPTION OF THE PREFERRED EMBODIMENT

Figure 1:
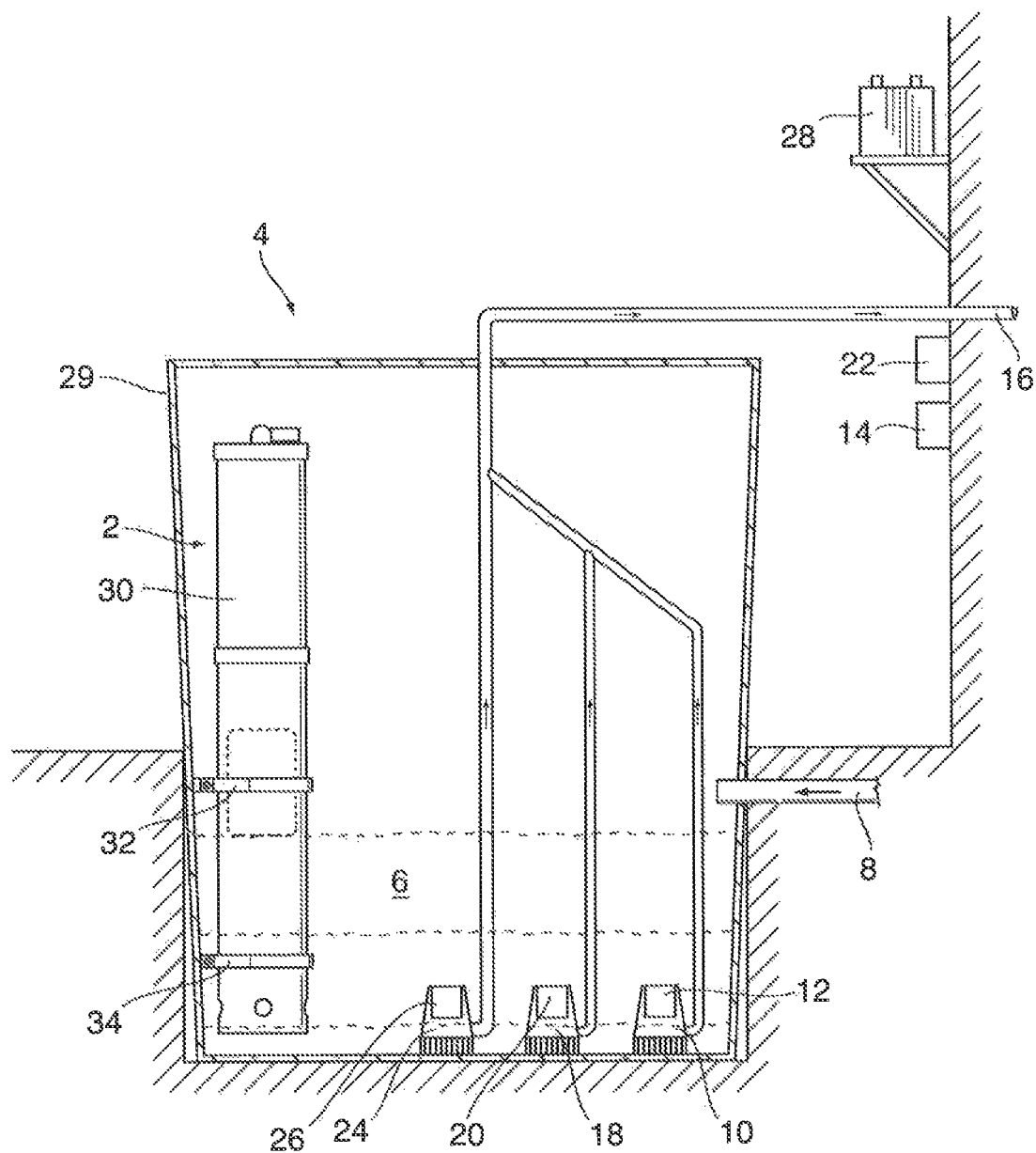
FIG. 1 depicts the sump pump system.

FIG. 1 shows a float switch apparatus 2 used in connection with a pump system 4. The pump system 4 is used to control a level of liquid, such as water, waste water, or sewage in a vessel such as a tank, vat or sump 6. FIG. 1 shows an embodiment wherein the vessel is a sump and liquid enters the sump 6 through inlet 8.

Referring to FIG. 1, the pump system 4, incorporates a primary pump 10 which is connected to and driven by an electric motor 12. The pump 10 and motor 12 are both in the same sealed housing in the form of a submersible pump. As can be appreciated by someone skilled in the art, other embodiments may include alternative pumping arrangements. The motor 12 is electrically connected to and driven by an AC power source such as conventional 120V AC electrical outlet 14. The discharge of pump 10 is coupled to the discharge outlet 16.

The pump system 4 also includes a secondary pump 18 coupled to and driven by electric motor 20 in the form of a submersible pump. The motor 20 is also connected to and driven by an electric power source such as a 120 volt or 240 volt AC electrical outlet 22. If the power handling capacity of the power source for motor 12 is sufficient to handle the operation of two pump motors, power source for motor 20 may, if allowed by local electrical codes, be the same as for motor 12. However, it should be noted that it may in fact be desired to ensure that the power source for motor 20 is different than that for motor 12. For example, the outlet 22 may be powered by a backup generator operating during a power failure. The discharge of pump 18 is also connected to the discharge outlet 16.

The pump system 4 is shown to incorporate an optional third pump 24 which is connected and driven by a direct current motor 26. This pump is connected to and driven by a direct current power source such as battery 28. Although not shown, the battery 28 would preferably be connected to a power source such as a trickle charger, so as to be fully charged during the periods when the battery 28 is not being used to drive DC motor 26. The discharge of this pump is also connected to the discharge outlet 16. It should be noted that for clarity purposes all wiring connections of the pumps to their power sources have been omitted.

Although pump system 4 is shown to have a common discharge line 16, it is possible for each motor to have their own individual discharge line. According to many building codes, the entire pump system 4 is encased in a sump tank 29 to seal the contents of the sump from the building atmosphere.

The float switch apparatus 2 comprises a guide structure 30 which is mounted in a fixed position to the sump 6. As shown in FIG. 1, the guide structure 30 is mounted by means of clamping brackets 32 and 34 to the side of the sump 6. Other mounting arrangements may be used.

Figure 2:
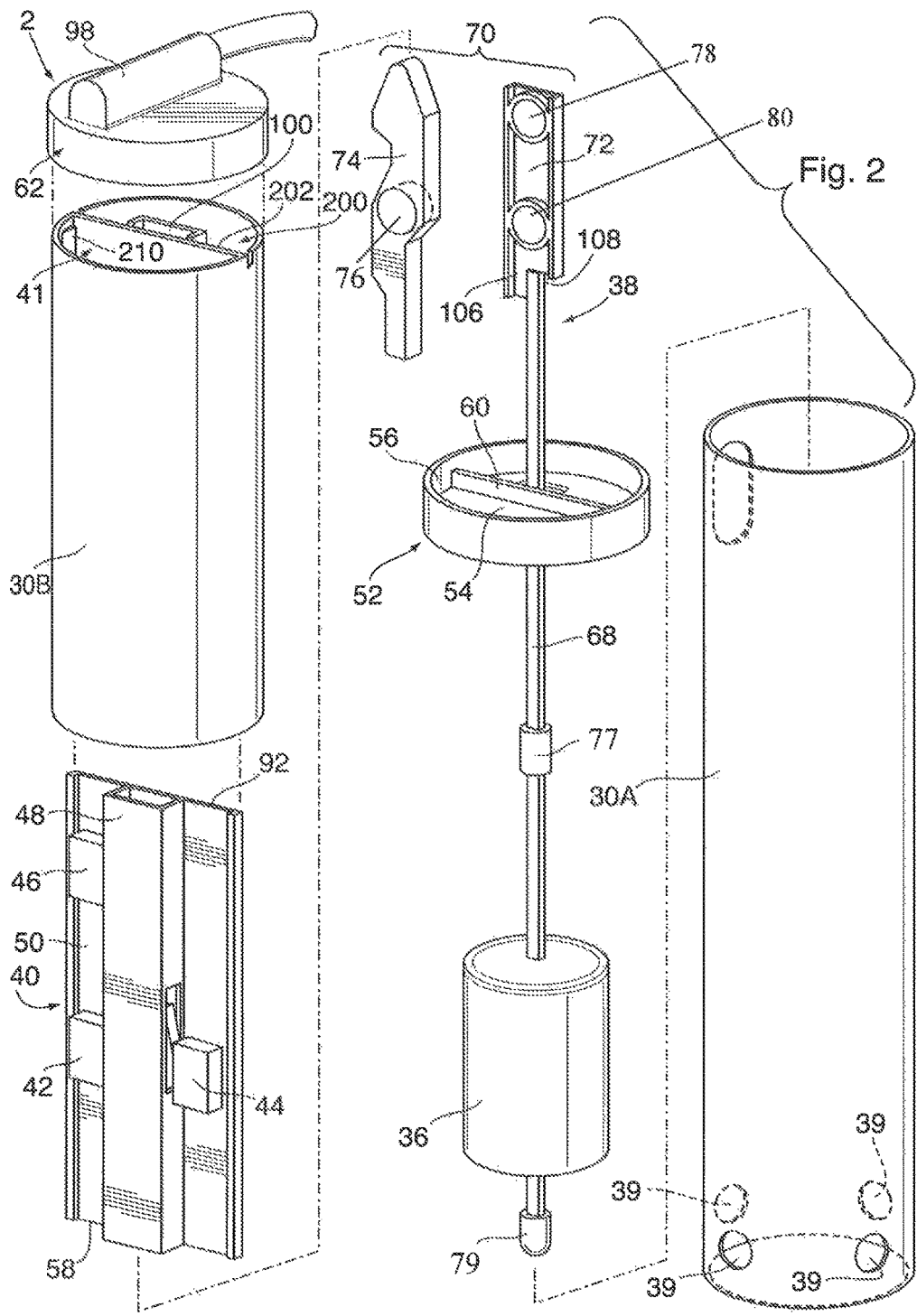
FIG. 2 is an exploded view of the float switch assembly.

As shown in FIG. 2, the guide structure 30 is broken into a lower component 30A and an upper component 30B. The lower component 30a is sized to accommodate a float 36 of a float rod assembly 38. The float rod assembly 38 includes the float 36, float rod 68 and a magnetic coupling 70, as described below, consisting of a coupling head 72 and a cam 74. The float rod 68 has an upper float stop 77 and a lower float stop 79 at the lower portion thereof. The float 36 is slidably mounted to the float rod 68 between the lower float stop 79 and upper float stop 77, as shown in FIG. 2.

The lower component 30A of guide structure 30 serves to protect the lower portion of the float rod assembly 38 from coming into contact with debris or other objects, floating or otherwise, that may be present or introduced into the sump 6. To allow liquid in the sump 6 to enter the lower component 30A, openings 39 are provided in the lower component 30A of guide tube 30. It should be noted that the lower portion of the guide tube can be omitted. In such an embodiment, lower portions of the float rod assembly 38 would depend in an exposed manner into the liquid sump 6.

The upper component 30B of the guide tube 30 comprises an electrical chamber 41 and a float rod chamber 200. These two portions are separated by chamber wall 202 which extends the length of the upper component 30B of the guide tube 30. The chamber wall 202 has a coupling head guide channel 100 outwardly extending therefrom into the float rod chamber 200 of the upper component 30B of the guide tube 30. This coupling head guide channel 100 is sized to allow the coupling head 72 of the float rod assembly 38 to freely move vertically within. The coupling head guide channel 100 ensures that the coupling head 72 of the float rod assembly 38 remains close to the chamber wall 202 to ensure a magnetic coupling with the cam 74 is maintained. The coupling head guide channel 100 is also advantageous during the assembly process in keeping coupling head 72 in a position which allows for simplified alignment and magnetic engagement with cam 74.

The electrical chamber 41, as shown in FIG. 16, contains two guide ridges 208 and 210 on opposite sides of the electrical chamber 41. These two guide ridges 208 and 210 run at least part length of the upper component 30B (as shown in FIG. 7) of the guide structure 30 and are spaced from the chamber wall 202 at such a distance to accommodate the insertion of a switch mounting panel 40, as shown in FIG. 17. The structures ensure the switch mounting panel 40 remains adjacent the chamber wall 202 to facilitate the coupling between the coupling head 72 and the cam 74. As such, the cam guide channel 48 of the switch mounting panel 40 is positioned such that it is opposite the coupling head guide channel 100. This ensures proper alignment of the coupling head 72 and cam 74 of the magnetic coupling 70.

The bottom of the electrical chamber 41 is defined by floor 54 of connecting collar 52, while the top of the electrical chamber 41 is defined by cap 62. The switch mounting panel 40 includes several micro switches 42, 44, and 46 mounted adjacent and in communication with a cam guide channel, 48. Additionally, it includes a separating wall 50 to hold the micro switches. Each micro switch is electrically coupled to a pump to control the activation thereof. In the embodiment shown first switch 42 controls motor 12, the second switch controls motor 20 and the third switch 46 controls motor 26.

The connecting collar 52 includes a floor portion 54 which extends inwardly from the interior wall 56 of the collar 52. This floor can be directly coupled to the chamber wall 202 and sealed along the bottom edge 58 thereof. The floor can either be sealed directly to the bottom edge 58 of the chamber wall 202, or may include a vertical wall 60 extending upwardly from the floor 54 to facilitate easier seal between the bottom edge of the chamber wall 202 and the floor 54.

The connecting collar 52 is sealed along the inner wall 56 below the floor 54 to the lower component 30A of the guide structure 30 and is sealed along the inner wall 56 above the floor 54 to the upper component 30B of the guide structure 30 to couple the upper component 30B and lower component 30A of the guide structure 30 together.

Figure 14:
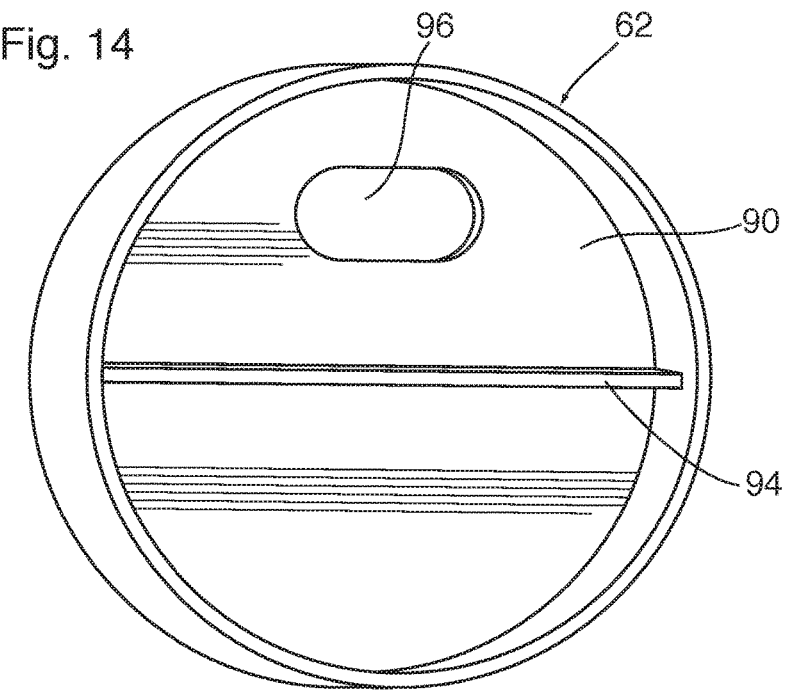
FIG. 14 shows the bottom of the lid of the electrical chamber.

The upper component 30B of the guide structure 30 includes a cap 62, the underside of which is shown in FIG. 14, which is sealed about the perimeter of the top of the upper component 30B of the guide structure 30. The cap 62 ceiling 90 provides a surface for sealing to the upper edge of or chamber wall 202. Alternatively, a wall 94 may extend downwardly from the ceiling 90 to provide a surface to which the separating wall 50 or chamber wall 202, is sealed. This cap 62 is equipped to provide a sealed electrical connection to power all the circuits connected to the micro switches 42, 44 and 46. Electrical wiring exists the electrical chamber through hole 96 in cap 62. As shown in FIG. 2, an electrical channel 98 can be provided on the top of cap 62 to ensure the wires and electrical chambers are isolated from the sump environment. When the cap 62 is in place, the hole 96 aligns with the electrical chamber 41 side of the upper component 30B of the guide tube 30.

Further sealing along the top edge of the chamber wall 202 as well as optionally on the top edge of the separating wall 50 and top wall 99 covering the cam guide channel 48 to the cap 62 is possible. Sealing in a preferred embodiment includes the use of clear ABS glue. Other alternative sealing mechanisms including integrally forming the dividing collar 52 with the upper component 30B of the guide tube 30 would be possible and known to a person skilled in the art.

The coupling head 72 of the magnetic coupling 70 is attached to the top of the float rod 68. The coupling head 72 is adapted to magnetically couple to the cam 74 through the separating wall 50 of the switch mounting panel 40 and the chamber wall 202 of the upper component 30b of the guide structure. The cam 74 is designed to slide within the cam guide channel 48 of the switch mounting panel 40, while the coupling head is sized to slide within the coupling head guide channel 100, shown in FIG. 15. Thus, since the float rod 68 is magnetically coupled to the cam 74, as the float rod 68 is pushed upward, the coupling head 72 is also pushed upward. Thus, as shown in FIG. 4, the coupling head 72 is on one side of chamber wall 202 and separating wall 50 while the cam portion 74 is located on the opposite side of the chamber wall 202 and separating wall 50. This allows for the movement of the cam 74 within the cam guide channel 48 without any physical contact of the cam 74 with the float rod 68. Such a structure allows the electrical portions of the float switch assembly to remain isolated from the sump atmosphere.

Figure 15:
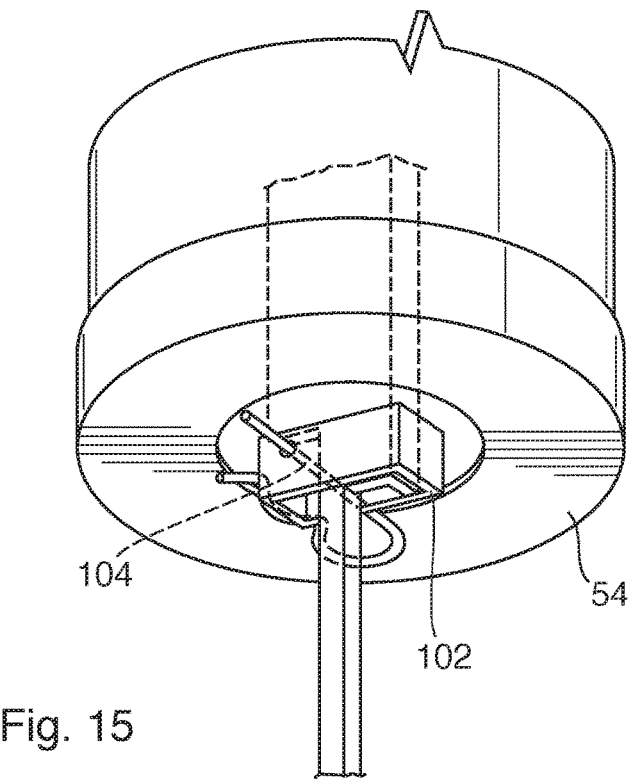
FIG. 15 shows a preferred mechanism for maintaining the coupling head within the guide channel.

The floor 54 of the connecting collar 52 includes a hole on the float rod chamber side through which the float rod 68 and the coupling head 72 of the magnetic coupling 70 can slide. This allows for easy assembly of the float rod portion 38 after the electrical chamber has been sealed. As illustrated in FIG. 15, there is a securing channel 102 coupled to the underside of floor 54. The securing channel 102 is sized to allow the coupling head 72 to pass therethrough. Referring to FIG. 2, the coupling head 72 has an extension foot 106 on the bottom thereof. On the opposite side of the extension foot 106 is a bottom edge 108. Once the float rod is assembled and the coupling head 72 is fed through the channel 102, a cotter pin 104 is passed through a portion of the channel 102. This cotter pin is positioned on the opposite side of the channel as the foot 106 of the coupling head 72. If the liquid level in the sump 6 is low, the downward movement of the float rod 68 will be stopped when the lower edge 108 of the coupling head makes contact with the cotter pin 104.

The magnetic coupling 70 preferably includes three magnets. The coupling head 72 contains two such magnets spaced and secured a fixed distance apart. The cam 74 contains one magnet in the body thereof. As can be appreciated, the cam 74 could alternatively be equipped with two magnets, while the coupling head would have one magnet. In the preferred embodiment, the magnets are axially magnetized and are oriented such that like poles are all facing the chamber wall 202.

FIG. 5 is an illustration of the magnets in isolation. FIG. 5 shows that the cam magnet 76 of the cam 74 has the north pole of the magnet adjacent the separating wall 50 and chamber wall 202. The magnets 78 and 80 of the coupling head 72 also have the north pole of magnets adjacent the chamber wall 202. Although the figure shows all magnets having a north pole facing the chamber wall 202, it is understood that all magnets could have the south pole adjacent the chamber wall 202 with the same result. This causes repulsion along the circumferences of the cam magnet and the coupling portion magnets, however, the magnetic field of the cam magnet 76 is directed straight outwardly (magnetic field line 103) at the center of the north face thereof. At this point, this magnetic field aligns with the magnet fields of the two coupling magnets 78 and 80 causing an attraction force. This, in combination with the circumferential repulsion, essentially traps the cam magnet 76 at a generally central location between the coupling magnets 78 and 80.

Even though there is a weak magnetic attraction at the neutral or generally central position of the coupling head 72, the magnetic field is most concentrated at the circumference of the magnets and as such, any deviation from this position causes a repulsion force between the cam magnet 76 and either the first coupling magnet 78 or the second coupling magnet 80. This maintains the cam magnet 76 and cam 74 in a central location between the two coupling magnets 78 and 80. This arrangement is shown in side view in FIG. 6 without the magnet fields.

In some embodiments, the force of the vertical movement of the float rod can overcome the attractive force as the repulsive forces cause the coupling head to be pushed away from the chamber wall 202. However, the coupling head guide channel 100 has a small tolerance in its depth 101 (shown on FIG. 16) which allows for very little movement of the coupling head 72, allowing the coupling head 72 to maintain a connection with the cam 74. The degree of acceptable tolerance in the depth 101 of the coupling head guide channel 100 varies depending on the properties of the magnets used.

This particular magnetic arrangement allows for enough attraction between the magnets to maintain a connection between the cam 74 and the coupling head 72 of the magnetic coupling 70 through the chamber wall 202, without creating enough friction to prevent the vertical movement of the float apparatus 38 as the water level rises or falls. In a preferred embodiment, the magnets are axially magnetized neodymium disc magnets. Although this is the preferred magnetic coupling arrangement, alternative magnetic coupling arrangements including two or more magnets would be possible.

With reference to FIG. 7, showing the assembled guide tube and float rod assembly, the float 36 is slidably mounted, by means of a hole along its central axis, to the float rod 68 between upper and lower float stops 77 and 79 respectively. The float 36 is sized and shaped to float, bearing the weight of the float rod assembly 68, on the surface of the liquid in the sump 6. As shown in FIG. 9, as the liquid in the sump 6 rises the float 36 will raise from its resting position atop of the lower stop 78 and will come in contact with the upper float stop 77. If the level of the liquid in the sump 6 continues to rise, the float 36 will push on the upper stop 77 and push the float rod assembly 38 upwardly. Generally, as the liquid level in the sump 6 drops, the float 36 will move downwardly in a corresponding manner, bearing the weight of the float rod assembly 38, unless the float rod assembly has been secured in a raised position as described below.

As described above, switches 42, 44 and 46 are mounted to the switch mounting panel 40 at positions above the anticipated maximum acceptance level of the sump 6. The switches 42, 44, and 46 are snap action micro switches. In general, such micro switches are robust and relatively inexpensive devices. They typically have a long life expectancy and can survive millions of cycles of operations. Many such micro switches are capable of handling the electrical power required by typical electrical circuits with which the present invention would be used. They have an established track record of reliable performance under a wide variety of conditions.

A snap action micro switch is biased by the resilience of its internal components into a normal position. A modest amount of force, herein reference to the actuation force, must be applied to the switch's actuator, for example a button or a lever arm, to toggle the switch from its normal position to its engaged position. Such snap action micro switches typically have internal wiring connections which allow a user to select whether the switch will be in its normal position, wired as "normally open", meaning the switch and corresponding circuit is open when the switch actuator is in its normal or non-engaged position, or "normally closed", meaning the switch and corresponding circuit is closed when the switch actuator is in its normal or non-engaged position. The first switch 42 is mounted to the switch mounting panel 40 at a location whereby when the float rod assembly 68 is at its resting position, the switch will not be activated. When the float rod assembly 68 is raised to a first activation position corresponding to a normal maximum level $L_{nm}$ liquid in the sump 6, the activation of first switch 42 is triggered and the first pump motor 12 and corresponding pump 10 are energized.

More specifically, first switch 42 and float rod assembly 68 in its resting position, as shown in FIG. 9, are positioned relative to each other whereby the biasing of switch 42 holds the switch actuator 42a against a first cam surface 84 in which switch 42 is in its engaged position (ie. Switch actuator 42a is pushed inwardly toward the switch 42). Because switch 42 is wired as "normally closed", in its engaged position the switch and corresponding electrical circuit is open and the motor 12 and corresponding pump 10 are not energized.

In this resting position, shown in FIG. 9, the second switch 44 is located at approximately the same vertical position as the first switch 42, however it is on the opposite side of the cam 74. The second switch is also configured to be in the "normally closed" position and the actuator arm 44a is biased inwardly into the engaged position by cant surface 82. Again, in this position the second switch 44 and corresponding electrical circuit is open and the associated motor 20 and pump 18 are not energized.

Upward movement of float road assembly 68 moves the cam 74 upward, as shown in FIG. 10. The activation arm 42a is allowed to return to its normal position as the cam 74 contains a recess and the actuator arm 42a is no longer pushed by the cam 74 into an engaged position. In this normal position, switch 42 and corresponding circuit is closed and the associated motor 12 and pump 10 is energized.

Assuming pump 10 is preforming properly, the level of liquid in the sump 6 drops and the float 36 moves downwardly accordingly. Under the influence of gravity, the float rod assembly 68 tends to move downwardly as well but encounters the resistance of switch 42's biasing force. The angled cam surface 86 provides a ramp in which the actuator 42a is pushed upwardly, however the weight of the float rod alone is insufficient to overcome the resistance of the biasing force of the actuator 42a. The pump 10 remains energizes until the float 36 falls with the liquid levels in the sump 6 and rests on the lower stop 79. At this point the weight of the float and the float rod is sufficient to push the actuator arm 42a up the cam surface 86 into its fully engaged position against cam surface 84. In this position the first switch 42 is opened and the motor 12 and corresponding pump 10 are deactivated.

Figure 12:
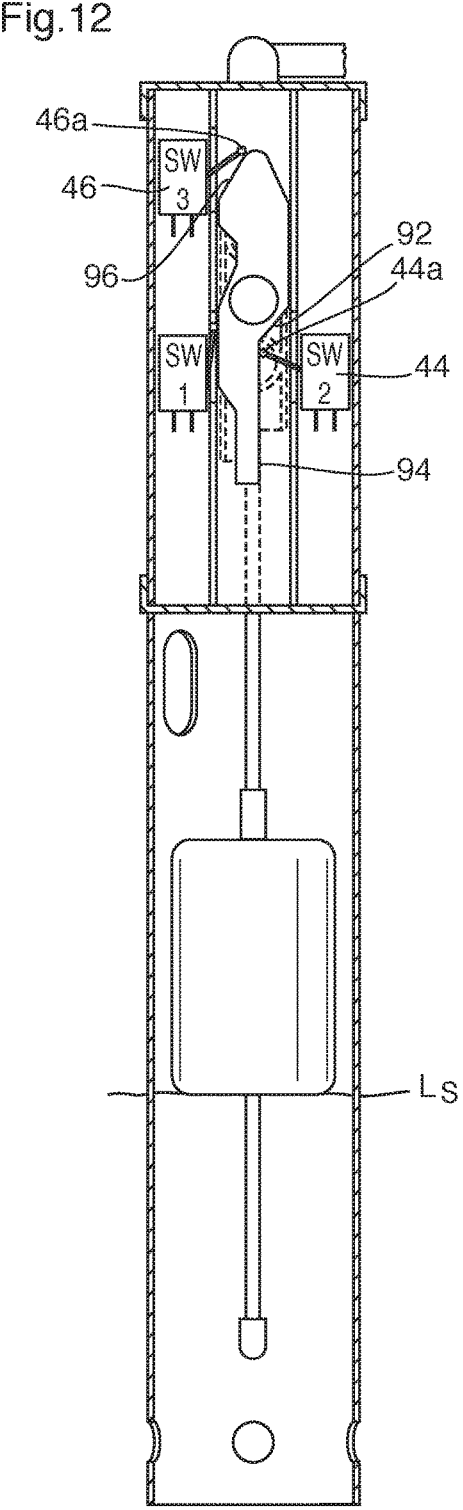
FIG. 12 shows the float rod and cam of the float switch apparatus in a forth position when the liquid in the vessel has reached a second predetermined level and the second switch has been activated.

Should the first pump 10 not be performing properly, or should the liquid level in the sump 6 be rising too quickly for pump 10 to provide sufficient discharge of the liquid, the float rod 68 will continue to be pushed upward by the float 36. This further upward movement of the float rod assembly 68 from its first activation position will add a second activation position, corresponding to a secondary levels of the liquid in the sump 6, trigger the activation of the second switch 44 to energize the second motor 20 and corresponding pump 18. This position is shown in FIG. 12.

However, just before the second switch 44 is moved into a closed position, the activation arm 42a of switch 42 is ramped in along cam surface 88 until it reaches a second flat cam surface 90. At this point activation arm 42a of switch 42 is pushed into its engaged position and switch 42 is open. This ensures that pump 10 and motor 12 will be de-energized. At this precise liquid level the second switch 44 is also open and the second motor 20 and corresponding pump 18 is also inactive. This ensures that the two AC pumps will not be active at the same time, which would create an excess power drain.

Figure 11:
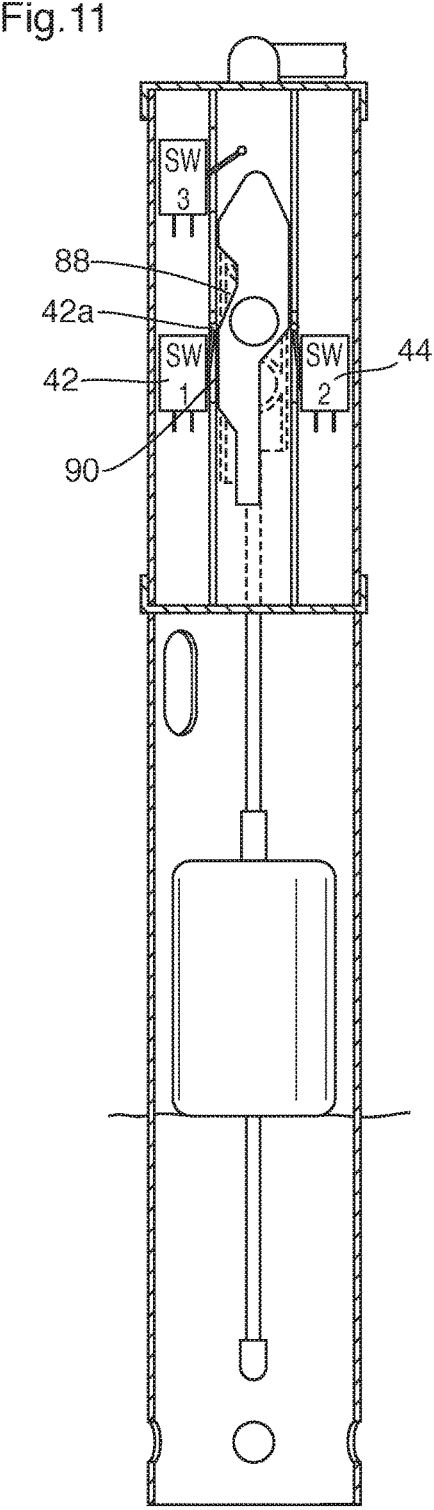
FIG. 11 shows the float rod and cam of the float switch apparatus in a third position when the first switch has been deactivated and the second switch has yet to be activated.
Figure 13:
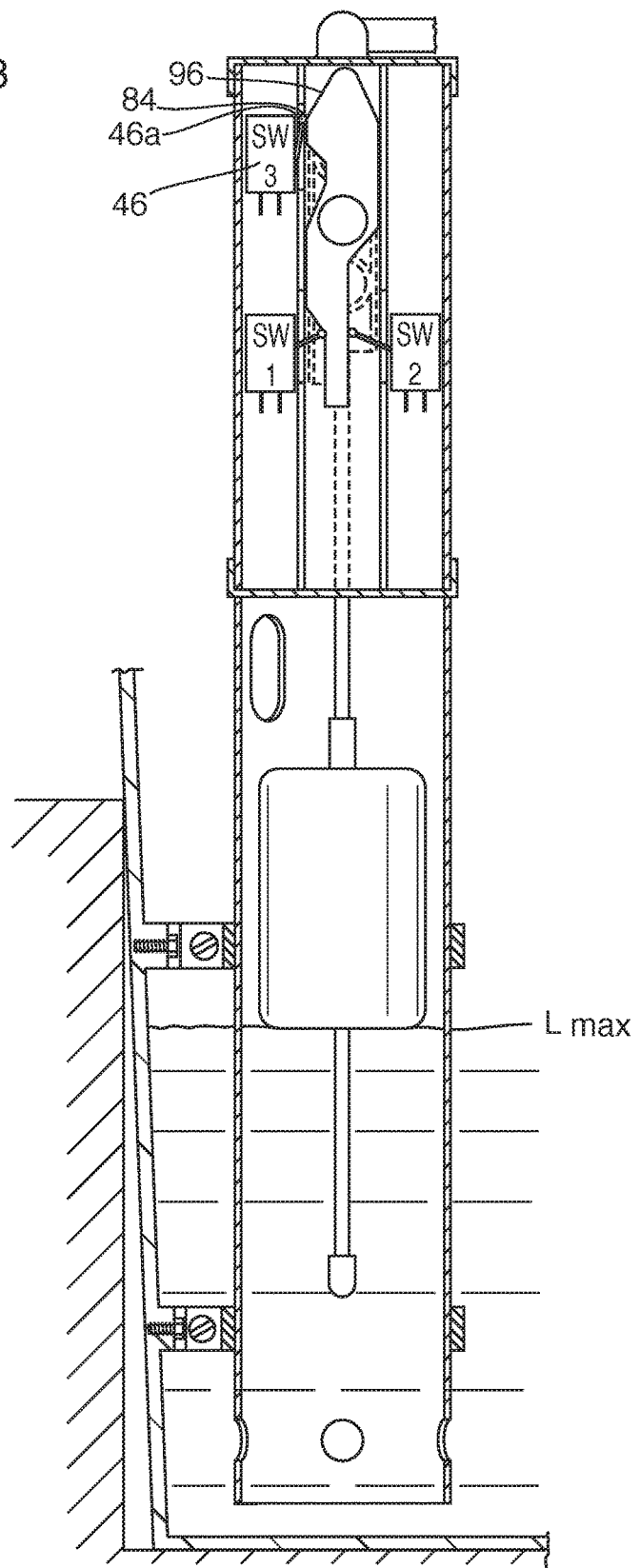
FIG. 13 shows the float rod and cam of the float switch apparatus in a fifth position corresponding to a third predetermine liquid level wherein a third switch is activated.

The second switch 44 is set to be open in its engaged position as shown in FIG. 11. As the water level rises to the secondary level, Ls, the activation arm 44a of the secondary switch ramps down and angled cam surface 92 until it is in a normal position. This causes the secondary switch 44 to be in a closed position which energizes the second motor 20 and corresponding pump 18. A lower cam surface 94 is positioned such that even if the water level were to continue to rise the actuator arm of 44a of the secondary switch 44 is allowed to remain in the non-engaged position and the switch 44 would remain closed. Should the water level continue to rise to a maximum level, $L_{max}$, a third switch 46 controlling a DC motor 26 and corresponding pump 24 would be activated. As shown in FIG. 12 the third switch 46 is set to a "normally open" position when actuator arm 46a is in its normal position. As the water level rises the actuator arm 46a is pushed along angled cam surface 96 until it reaches cam surface 84 at which point actuator arm 46a is in its fully engaged position and switch 46 is pushed into a closed position. This activates DC motor 26 and corresponding pump 24. This position is shown in FIG. 13. It should be noted that in this position both switch 46 and switch 44 are in the closed position and both motor 20 and motor 26 are activated.

Figure 18:
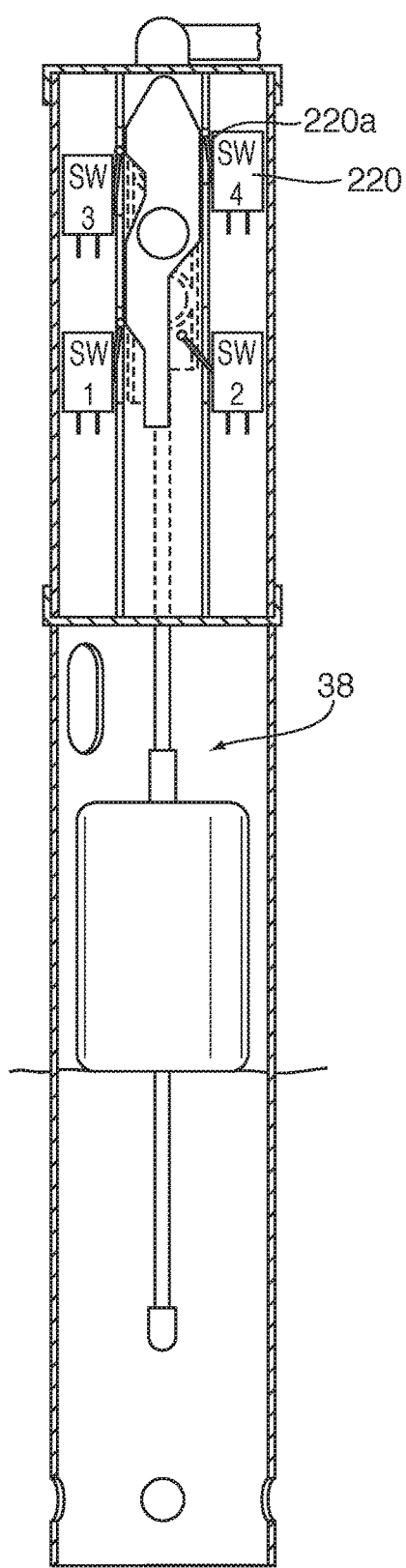
FIG. 18 shows an alternative embodiment where a forth switch is used to activate an alarm or other device.

Although the preferred embodiment disclosed herewith contains three pumps including two AC pumps and one DC pump, any combination of pumps and any number of pumps could be used. By making small adjustments to the cam surfaces, different pumps could be engaged at different levels of liquid in the sump. Furthermore, additional switches could be added to engage optional alarms. For example, as shown in FIG. 18 the float switch apparatus includes a forth switch 220 which is wired to activate an alarm. As the float rod assembly 38 moves upward with a rising water level presumably associated with the malfunction or insufficient performance of the pumps, the forth switch 220 is moved from a "normally open" position with the actuator arm 220a not engaged, to an engaged position of actuator arm 220a. This moves the forth switch 220 into a closed position and activates the associated alarm. As can be seen in FIG. 18, in this position all 4 switches are in the on position. This is particularly advantageous should there be a power outage. During the outage, the DC pump activated by switch 3 would remain on, but potentially the liquid level could still rise. By having all 4 switches in the ON position, when power is restored, all the pumps will be activated to remove the liquid from the vessel. As can be appreciated, the cam profile can be adapted for any number of pumps and alarms without deviating from the scope of the invention.

It can also be appreciated that the switch panel 40 could be made with the switches and cam guide channel on one side of the separating wall 50 and the coupling head guide channel on the opposing side of the separating wall 50. The entire panel could then be inserted into the upper portion 30b of the guide structure 30 and sealed along its edges. This would eliminate the need for the chamber wall 202. However, the removable switch panel is advantageous in terms of repairs in that should something need replacing on the panel, only the switch panel would need to be removed and replaced.

Although various preferred embodiments of the present invention have been described herein in detail, it will be appreciated by those skilled in the art that variations may be made thereto without departing from the appended claims.

The embodiments of the invention in which an exclusive property or privilege is claimed are defined as follows:

1. A float switch apparatus for use in a sump pump vessel comprising;
   an electrical chamber sealed from the vessel atmosphere and having a coupling wall;
   said electrical chamber including at least one switch controlling the activation of at least one pump configured to pump liquid out of the vessel;
   said electrical chamber further including a magnetic activation device slidable vertically along the coupling wall and configured to activate said at least one switch when liquid in the vessel reaches a predetermined level;
   a float responsive to liquid level in the vessel;
   said float being mounted on a float rod having a magnetic coupling head configured to magnetically couple to the magnetic activation device through the coupling wall such that vertical displacement of the magnetic coupling head results in a corresponding vertical displacement of the magnetic activation device;
   said float being mounted such that as the float responds to the liquid level in the vessel, the float will move the float rod and magnetic coupling head vertically.

2. A float switch apparatus as claimed in claim 1 wherein the magnetic activation device is a cam.

3. A float switch apparatus as claimed in claim 2 wherein the electrical chamber includes at least a first switch, a second switch and a third switch;
   Said first switch configured to be activated by the vertical position of the cam when the liquid in the vessel reaches a first predetermined level activating a first pump, said second switch configured to be activated by the vertical position of the cam when the liquid in the vessel reaches a second predetermined level, activating a second pump and said third switch configured to be activated by the vertical position of the cam when the liquid in the vessel reaches a third predetermined level, activating a third pump.

4. A float switch apparatus as claimed in claim 3 wherein the first switch is deactivated and the first pump is deactivated when the liquid level in the vessel reaches the second predetermined position.

5. A float switch apparatus as claimed in claim 4 wherein the magnetic coupling head is contained within a coupling head guide channel to facilitate easy alignment with the cam.

6. A float switch apparatus as claimed in claim 5 wherein the cam is contained within a cam guide channel and both the cam guide channel and the coupling head guide channel have a depth determined such that the cam and coupling heads respectively maintain close contact with the coupling wall.

7. A float switch apparatus as claimed in claim 6 wherein the guide channel has a collar through which a pin can be place to maintain the coupling head in the guide channel after assembly.

8. A float switch apparatus as claimed in claim 2 wherein two magnets are arranged in a spaced configuration in the coupling head and one magnet is arranged in the cam such that all like poles of the magnets are directed toward the coupling wall.

9. A float switch apparatus as claimed in claim 8 wherein the magnets are disk magnets.

10. A float switch apparatus as claimed in claim 9 wherein the magnets are axially magnetized neodymium disc magnets.

\* \* \* \* \*